W. M. FULTON.
DAMPER REGULATOR.
APPLICATION FILED JAN. 30, 1906.
No. 909,176.
Patented Jan. 12, 1909.
2 SHEETS—SHEET 1.
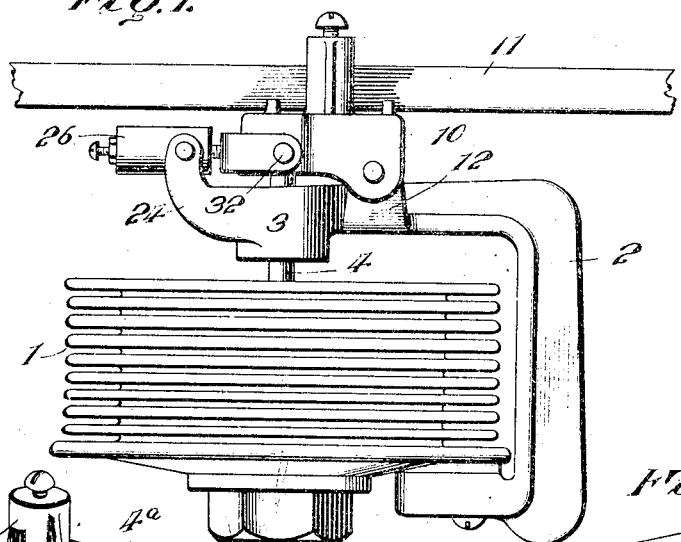
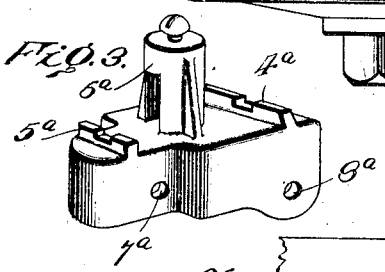
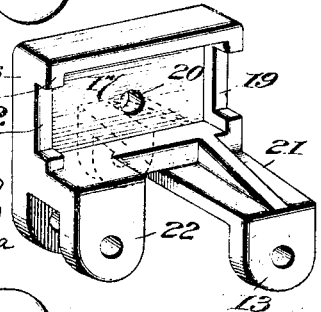
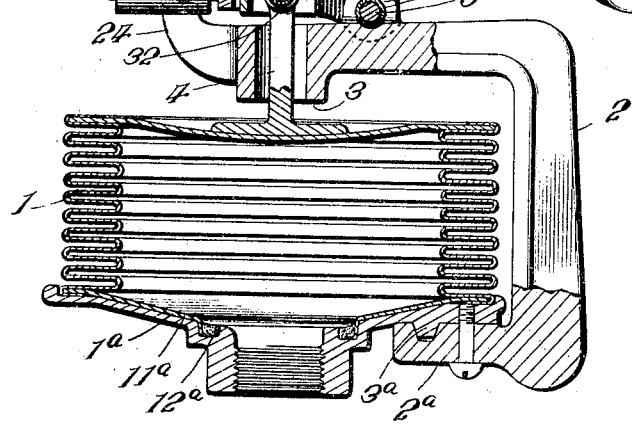
Witnesses
Gustave R. Thompson.
Ruth C. Fitzhugh
Inventor
Weston M. Fulton
By Mauro, Cameron, Lewis Massie
Attorneys W. M. FULTON.
DAMPER REGULATOR.
APPLICATION FILED JAN. 30, 1906.
909,176.
Patented Jan. 12, 1909.
2 SHEETS—SHEET 2.
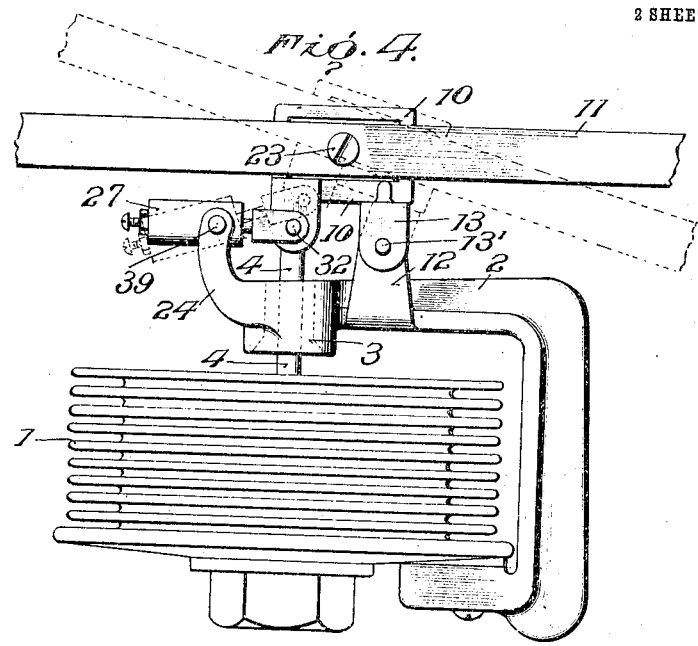
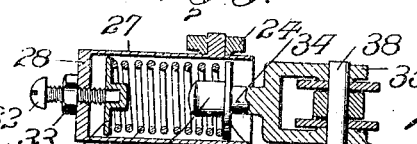

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

DAMPER-REGULATOR.

No. 909,176.          Specification of Letters Patent.          Patented Jan. 12, 1909.

Application filed January 30, 1906. Serial No. 298,713.

*To all whom it may concern:*

Be it known that I, WESTON M. FULTON, of Knoxville, Tennessee, have invented a new and useful Improvement in Damper-Regulators, which invention is fully set forth in the following specification.

This invention relates to damper regulators for use with low pressure steam boilers, and more particularly to that class of regulators in which motion is imparted to a lever through the movement of a collapsible and expansible vessel actuated by steam pressure from the boiler, and has for its object to secure sensitiveness of action under varied conditions of pressure, to provide for a wide range of movement and durability in construction.

Heretofore in damper regulators employing a steam-actuated collapsible and expansible vessel the movable end of the vessel has been provided with a direct connection by means of a plunger to the power lever which operates the damper through a flexible connection and the steam from the boiler entering the collapsible and expansible vessel has imparted movement thereto against the increasing resistance of the walls of the expanding vessel. A similar increasing resistance has been encountered when the walls of the vessel were collapsed beyond a certain normal position. Certain disadvantages have resulted from such constructions. Often torsional strains on the power-lever result in excessive shearing and binding of the pivotal supports of the lever, thereby greatly detracting from the sensitiveness of the regulator. Again certain styles of boilers in the market require an unusually large movement of the power-lever in order to open and close the damper. To secure this movement the collapsible and expansible vessel requires a correspondingly lengthy movement. In such cases the resilience of the walls of the collapsible and expansible vessels offers an increasing resistance to expansion or contraction beyond a certain normal position and this resistance is approximately proportional to the distance through which it is forced from its normal position. It results under such conditions that greater steam pressure is required to give the vessel a given increase in movement as the vessel expands beyond this normal position. The same is also true for movements of the vessel below a certain normal position. The sensitiveness of the regulator to changes in pressure thereby decreases as the pressure increases.

Regulators of this class are usually installed on steam boilers used for house-heating purposes and are often subjected to accumulation of dust and rust which in time gathers about the pivots upon which the damper lever turns and thereby impairs the efficiency of the regulator. Heretofore the damper lever has been pivoted directly to the collapsible and expansible vessel itself, but the bulky nature of this lever necessitated its detachment in shipping, thereby requiring a re-adjustment of the lever when the regulator is installed on the boiler. Failure to properly adjust the lever and exclude all dirt and grime from the pivots at this time would cause the regulator to fail to operate properly.

In regulators of the class employing collapsible and expansible vessels, it is desirable that the end walls, particularly the lower one, be rigid in order to act as a support for the vessel and parts connected thereto, and it is further essential that this wall should be of non-corrosive material to withstand corrosion and action of the steam. For this purpose sheet brass or copper has been found useful but such metals when of suitable thickness are precluded by reason of expense; therefore, it becomes desirable to devise other means for effecting the desired result.

With these objects in view the invention consists in providing the regulator of the class referred to with compensating means whereby the increasing resistance offered by the walls of the collapsible and expansible vessel may be overcome, thereby giving greater uniformity of action to the regulator.

The invention further consists in providing, for the reception of the damper lever in a regulator of the class referred to, a tilting support or rocker, whereby little or no skill is required in making adjustments of the lever, and obstructions by dirt and rust about the pivotal supports greatly lessened; and the invention further embraces other features of invention hereinafter set forth and pointed out in the claims.

Reference is had to the accompanying drawings in which—

Figure 1 is a front elevation and Fig. 2 is a part elevation and part a vertical section of the same, showing my improvements. Fig.

3 is a perspective view of one form of the rocker. Fig. 3ª is a perspective view showing a modification. Fig. 4 is an elevation showing the rocker of Fig. 3ª in position. Fig. 5 is a horizontal sectional detail of the compensating device shown in Figs. 1, 2 and 4.

Referring to Figs. 1 and 2, the collapsible and expansible vessel 1 which is to receive steam from a boiler not shown, rests on a metal base 1ª, preferably of cast metal, such as iron, and is secured thereto in a manner hereinafter explained. A bracket 2, for supporting the working parts of the regulator has a member 2ª, made fast to base 1ª, as by means of a bolt and a lug 3ª entering a socket in said member. Above the central top portion of the vessel 1, is a hub 3, on the end of the upper extension of the bracket 2, which serves as a guide for a plunger 4, fast to the movable top wall of said vessel. Extending from hub 3, is a forked bracket arm 24, pivotally mounted in which is a compensating device, carrying a spring pressed plunger 34, Fig. 5, provided with arms 35, receiving between them one end of the plunger 4, and an extension of the lever supporting rocker 10, which latter has its enlarged and rear portion pivotally supported in bearings 12 on said upper bracket arm.

In Figs. 2 and 3 are shown the detailed construction of this rocker which consists of a hollow casting open at the bottom and rear and having a top wall provided with a pair of centrally slotted guides 4ª, 5ª, and a slotted clamping post 6ª, on line therewith for receiving and retaining damper lever 11. The forward body portion of the rocker is narrower than the rear portion and is adapted as above stated to enter the forked end of plunger 34, and to receive the upper end of plunger 4, the said members being coupled together by a pivot pin 32. The side walls at the wider and rear portion of the rocker 10, serve as bearings and to this end are provided near the lower corners with holes 8ª, through which is passed a soft metal pivot pin 9ª to pivotally secure the rocker to lugs 12 on arm 2. The holes 12 in these lugs are preferably provided with metal bushings 10ª, such as brass, to avoid the formation of rust. A similar bushing may be placed in the bearing at the end of plunger 4. The soft metal pin 9ª is preferably headed after its insertion in holes 8ª thereby making it fast in its housing in the rocker walls, but permitting the same to oscillate in its brass bushing in lugs 12.

The form of support for the power-lever above described possesses the advantage of giving great freedom of movement, permitting the pivots to be made quite loose to avoid clogging by dirt and rust, and at the same time securing steadiness of movement by reason of the wide pivotal supports, without experiencing the evil results of binding at the pivots when torsional strains occur on the power-lever.

A further advantage resides in the great sensitiveness which this form of support gives to the regulator, and the ready adjustment of the damper lever in its binding post.

In Fig. 2 is shown the manner of constructing the bottom of the vessel whereby it may combine the advantages gained by the use of such non-corrosive metals as brass or copper and possess the necessary strength to support the vessel and its associated parts. 11ª is a non-corrosive metal plate of thin metal such as thin sheet brass or copper which may be secured to the corrugated wall of the vessel 1, as by welding brazing or soldering. At the central portion is a struck up annular ledge 12ª, the convex portion of which enters a corresponding groove in the metal base 1ª, surrounding the steam inlet and is made fast thereto by solder which also fills and strengthens the joint. Around the base 1ª, at its outer edge is preferably formed a bead for receiving the bottom of the vessel 1.

In Figs. 1, 2 and 4, I have shown the preferred form of compensating device, and in Fig. 5 a horizontal section of the same. The bracket arm 2 previously referred to is shown connected to the bottom of the expansible and collapsible vessel. In this form of the invention the top of the vessel 1 has a direct connection with the rocker 10, by means of a plunger 4', fast to the top of the vessel and pivotally attached to the rocker. Extending from hub 3, are upwardly extending arms 24, 24, for supporting the compensating device, which consists of a barrel 27, having a closure 28, and being open at its opposite end. The barrel 27, is mounted to oscillate in forks 25, as by means of trunnions 29, and incloses a spring 30, resting at its inner end against a flanged cap 31, into which enters a screw 32, threaded through head 28, and secured from turning by means of a jam nut 33. Resting against the outer end of the spring, is a plunger 34, terminating at its extremity in prongs 35, for engaging arms 22, on the rocker and having near its inner end a flange 36, for receiving the pressure of the spring and a head 37, for steadying the same.

The operation of the device thus far described is as follows: The parts of the regulator having been assembled at the place of manufacture, except as to the damper lever 11, the vessel 1 is connected up with the steam boiler not shown, and the lever 11, inserted through the slot in binding post 6ª, with its lower edge resting in the central retaining grooves 4ª and 5ª. The right-hand extremity of the lever is attached to the damper not shown by means of a flexible connection such as a chain. The lever is now adjusted in its binding post on the rocker to the desired position and clamped therein and brought into a horizontal position by lower ing the left arm thereof, and is balanced in this position preferably by adjusting a weight on said arm. It will be observed that the damper lever has been brought into a horizontal position against the pressure exerted by the regulator vessel while in open communication with the steam boiler and the device is set for maintaining this particular steam pressure. To a rise of steam pressure in the boiler, the regulator vessel responds by expanding and forcing the plunger 4, upward and tilting the rocker 10, which carries the damper lever. A continuation of such expansion of the vessel is soon resisted by the resiliency of the corrugated walls of the collapsible and expansible vessel, and were it not for the provision I have made for compensating this opposing force, further equal extensions of the vessel would require a proportionally larger increase in the steam pressure. The sensitiveness of the regulator would therefore decrease as higher pressures were reached. To overcome this, I have provided compensating means, one form of which, and the one preferred, is shown in its details in Fig. 5, and in position ready to act on the plunger of the collapsible and expansible vessel, Figs. 1, 2, either in an upward or downward direction, while in Fig. 4, the device is illustrated in dotted line position to better show its mode of operation.

The operation of the device is as follows: Plunger 34 is made of such a length that when the wall of the collapsible and expansible vessel is in its normal position pivots 13', 32 and 39, are in a straight line, the spring 30, then acting at right-angles to the plunger 4, and having no tendency to move it up or down. When the vessel 1 either expands or contracts, pivot 32 is carried either above or below the line joining pivots 13', 32 and 39, as the case may be, and a component of the force exerted by the spring is resolved in the line of the plunger to counteract the effect of the resilience of the walls of the vessel. In the dotted line position Fig. 4, this spring force will be exerted upward. This force within the comparatively narrow limits in the present case is practically proportional to the distance from which pivot 32 is moved away from its normal position and by properly adjusting the spring 30, by means of screw 32, the resiliency of the vessel can be practically neutralized.

Referring to Fig. 3ª there is illustrated in a perspective view a modified form of rocker for receiving the power-lever 11. This rocker consists of a body portion 16, preferably of cast metal, having a central depression 17, surrounded by an edge or rim 18, having cut-out portions 19, in line with each other and into which the lever 11, snugly fits and is secured by means of a screw or bolt entering the threaded opening 20. The object of depression 17, is to facilitate the construction of the rocker. In order to secure a good fit for the power-lever the slots 19, have to be machined out. By casting the depression 17, in the face of the body 16, and sinking it deeper than the bottom of the slots 19, only the metal in the rim has to be machined out. Cast integral with the body portion 16, of the rocker, at right-angles to the face of the same and at or near its lower edge is a member 21, provided with two depending arms 13, for engaging lugs 12, on bracket-arm 2. Similar arms 22, are preferably located at the opposite end of the rocker and are separated slightly to receive between them the connection to the collapsible and expansible vessel.

What I claim is:—

1. In a damper regulator, the combination of a rocker, a damper operating lever detachably connected thereto, a collapsible and expansible vessel of resilient material, subject to fluctuations of steam boiler pressure, and having a movable part thereof connected to said rocker, and compensating means to oppose the force of resilience in the walls of said vessel.

2. In a damper regulator, the combination of a pivotally supported member adapted to be connected to a damper, a collapsible and expansible vessel of resilient material subject to fluctuations of steam boiler pressure and having a movable part thereof connected to said member and compensating means to oppose the force of resilience in the walls of said vessel.

3. In a damper regulator, the combination of a rocker having a top wall provided with centrally slotted lugs, a slotted binding post in line therewith, and side walls constituting bearings for said rocker, and a damper lever adjustably mounted in said slotted members.

4. In a damper regulator, the combination of a rocker having a top wall provided with centrally slotted lugs, a slotted binding post in line therewith for receiving a damper lever and side walls integral with said top wall and constituting bearings for one end of said rocker, a damper lever adjustably mounted in said slotted members, and rocker-actuating means for said rocker.

5. In a damper regulator, the combination of a collapsible and expansible vessel having a wall of resilient material subject to fluctuations of fluid pressure, power transmitting means connected to one end of said vessel and a spring actuated plunger for applying force to the walls of said vessel to compensate the force of resiliency in said walls.

6. In a damper regulator, the combination of a collapsible and expansible vessel having a wall of resilient material subject to fluctuations of fluid pressure, power transmitting means connected to one end of said vessel, a pivotally supported, spring actuated plunger for applying force to the walls of said vessel to compensate the force of resiliency in said walls.

7. In a damper regulator, the combination of a collapsible and expansible vessel having a wall of resilient material subject to fluctuations of fluid pressure, power transmitting means connected to one end of said vessel, a pivotally supported spring actuated plunger for applying force to the walls of said vessel to compensate the force of resiliency in said walls and means for regulating the tension of said spring.

8. In a damper regulator, the combination of a collapsible and expansible vessel having a wall of resilient material subject to fluctuations of fluid pressure, a bracket, a rocker in said bracket, a connecting member between said rocker and one end wall of said vessel and a spring actuated plunger pivotally supported in said bracket and connected to said member for compensating the force of resiliency in the walls of said vessel.

9. In a damper regulator, the combination of a rocker a damper-operating lever detachably supported therein, a collapsible and expansible vessel of resilient material, subject to fluctuations of steam boiler pressure, and having a movable part thereof connected to said rocker, and means associated with said vessel for compensating for variations in the resilient force in the walls of said vessel due to longitudinal movement in said walls.

10. In a damper regulator, the combination of a power transmitting member, a collapsible and expansible vessel of resilient material subject to fluctuations of fluid pressure and having a movable part of said vessel connected to said member, and means associated with said vessel for compensating for variations in the resilient force in the walls of said vessel due to longitudinal movement in said walls.

11. In a damper regulator, the combination of a corrugated collapsible and expansible metallic vessel subject to fluctuations of fluid pressure, a support for the same, a bracket fast to said support, a lever-supporting rocker on said bracket, non-corrodible bearings for said rocker, and means for transmitting the movements of the vessel to said rocker.

12. In a damper regulator, the combination of a collapsible and expansible vessel having side walls of flexible corrugated non-corrodible sheet metal and provided with a thin bottom wall of like metal, said bottom wall having a central opening surrounded by an upset annular rib, a rigid reinforcing metal wall conforming to said bottom wall and having an opening concentric with the opening in said bottom wall and provided with an annular depression for receiving solder and securing therein said metal rib, a damper lever, and means secured to said reinforcing wall for supporting said lever.

13. In a damper regulator, the combination of a rocking member, a damper lever adjustably supported by said member, bearings for supporting one end of said member, and means subject to fluid pressure acting at the opposite end of said rocking member to operate the same.

14. In a damper regulator, the combination of a collapsible and expansible vessel having a flexible corrugated wall of resilient material, said vessel being subject to fluctuations in fluid pressure, a damper lever, power transmitting means transmitting the movements of said vessel to said lever, and compensating means engaging said power-transmitting means to oppose the force of resilience in the walls of said vessel.

In testimony whereof I have signed this specification in the presence of two subscribing witnesses.

WESTON M. FULTON.

Witnesses:
F. M. DeArmand,
W. E. Drummond.